United States Patent
Range et al.

(10) Patent No.: US 9,942,969 B1
(45) Date of Patent: Apr. 10, 2018

(54) OBSTRUCTIONS LIGHTING SYSTEM AND PROCESS HAVING OPERATING MODES

(71) Applicant: SPX Corporation, Charlotte, TN (US)

(72) Inventors: Keith Range, Franklin, TN (US); Russell Bruner, Franklin, TN (US)

(73) Assignee: SPX Corporation, Charlotte, NC (US)

(*) Notice: Subject to any disclaimer, the term of this patent is extended or adjusted under 35 U.S.C. 154(b) by 0 days.

(21) Appl. No.: 15/279,583

(22) Filed: Sep. 29, 2016

(51) Int. Cl.
  *H05B 37/00* (2006.01)
  *H05B 39/00* (2006.01)
  *H05B 41/14* (2006.01)
  *H05B 37/02* (2006.01)
  *H05B 33/08* (2006.01)

(52) U.S. Cl.
  CPC ..... *H05B 37/0263* (2013.01); *H05B 33/0815* (2013.01); *H05B 33/0845* (2013.01); *H05B 33/0857* (2013.01); *H05B 37/0218* (2013.01); *H05B 37/0281* (2013.01)

(58) Field of Classification Search
  CPC ............ H05B 37/0263; H05B 33/0815; H05B 33/0845; H05B 33/0857; H05B 37/0218; H05B 37/0281

USPC .......................................................... 315/250
See application file for complete search history.

(56) References Cited

U.S. PATENT DOCUMENTS 6,031,343 A * 2/2000 Recknagel ............... A63D 1/08
                                                      315/292
8,926,148 B2    1/2015 Shumate et al.

* cited by examiner

*Primary Examiner* — Daniel D Chang
(74) *Attorney, Agent, or Firm* — Baker Hostetler LLP

(57) ABSTRACT

The disclosure is directed to an obstruction lighting and power line control system. The system includes at least one light source, at least one controller coupled to and configured to control the at least one light source, a power line cable providing power to the at least one light source, and a power supply coupled to the power line cable and configured to provide power to the at least one light source over the power line cable. The disclosure further includes a system controller configured to control the power supply to provide power over the power line cable to the at least one light source and the at least one controller that indicates at least one of the following: operating parameters and operating modes.

16 Claims, 5 Drawing Sheets

OBSTRUCTIONS LIGHTING SYSTEM AND PROCESS HAVING OPERATING MODES

FIELD OF THE DISCLOSURE

This disclosure is generally directed to an obstruction lighting system having an operating mode control system, and more particularly to an obstruction lighting system having an operating mode control system implemented to control a mode of the obstruction lighting system responsive to supplied power provided over a power line.

BACKGROUND

Many conventional obstruction lights, e.g., beacon lights, marker lights, and the like that are deployed in obstruction lighting systems are constructed utilizing incandescent bulbs, light emitting diodes, or other types of light sources. During the course of operation, it is desirable to set and/or control various operating parameters and/or modes associated with such lights. Conventionally, technicians have to be physically near and directly interact with the obstruction light to manually set such parameters and/or modes. This is problematic as the typical obstruction light is arranged at the top of a tall structure, tall building, tall tower, or the like. Due to this location, directly interacting with the obstruction lights by the technicians exposes them to hazardous conditions (e.g., dangerous heights, dangerous environments, lightning, harsh weather, and/or the like). Moreover, it is time consuming and difficult for technicians to directly manually set such parameters and/or modes for the obstruction lights at such locations as they are typically difficult to gain access (e.g., locked doors, numerous stairs, and/or the like).

Accordingly, an obstruction lighting system is needed that reduces the difficulties in setting various operating parameters and/or modes associated with such lights without the above-mentioned drawbacks.

SUMMARY OF THE DISCLOSURE

According to an aspect of the disclosure, an obstruction lighting and power line control system includes at least one light source; at least one controller coupled to and configured to control the at least one light source; a power line cable providing power to the at least one light source; a power supply coupled to the power line cable and configured to provide power to the at least one light source over the power line cable; a system controller configured to control the power supply to provide power over the power line cable to the at least one light source and the at least one controller that indicates at least one of the following: operating parameters and operating modes.

According to a further aspect of the disclosure, an obstruction lighting and power line control process includes providing at least one light source; controlling the at least one light source with at least one controller; providing a power line cable to provide power to the at least one light source; providing power to the at least one light source over the power line cable with a power supply coupled to the power line cable; controlling with a system controller the power supply to provide power over the power line cable to the at least one light source and the at least one controller that indicates at least one of the following: operating parameters and operating modes.

Additional features, advantages, and aspects of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate aspects of the disclosure and together with the detailed description serve to explain the principles of the disclosure. No attempt is made to show structural details of the disclosure in more detail than may be necessary for a fundamental understanding of the disclosure and the various ways in which it may be practiced, as may be understood by one of ordinary skill in the art in view of the present disclosure. In the drawings.

DETAILED DESCRIPTION OF THE DISCLOSURE

Figure 1:
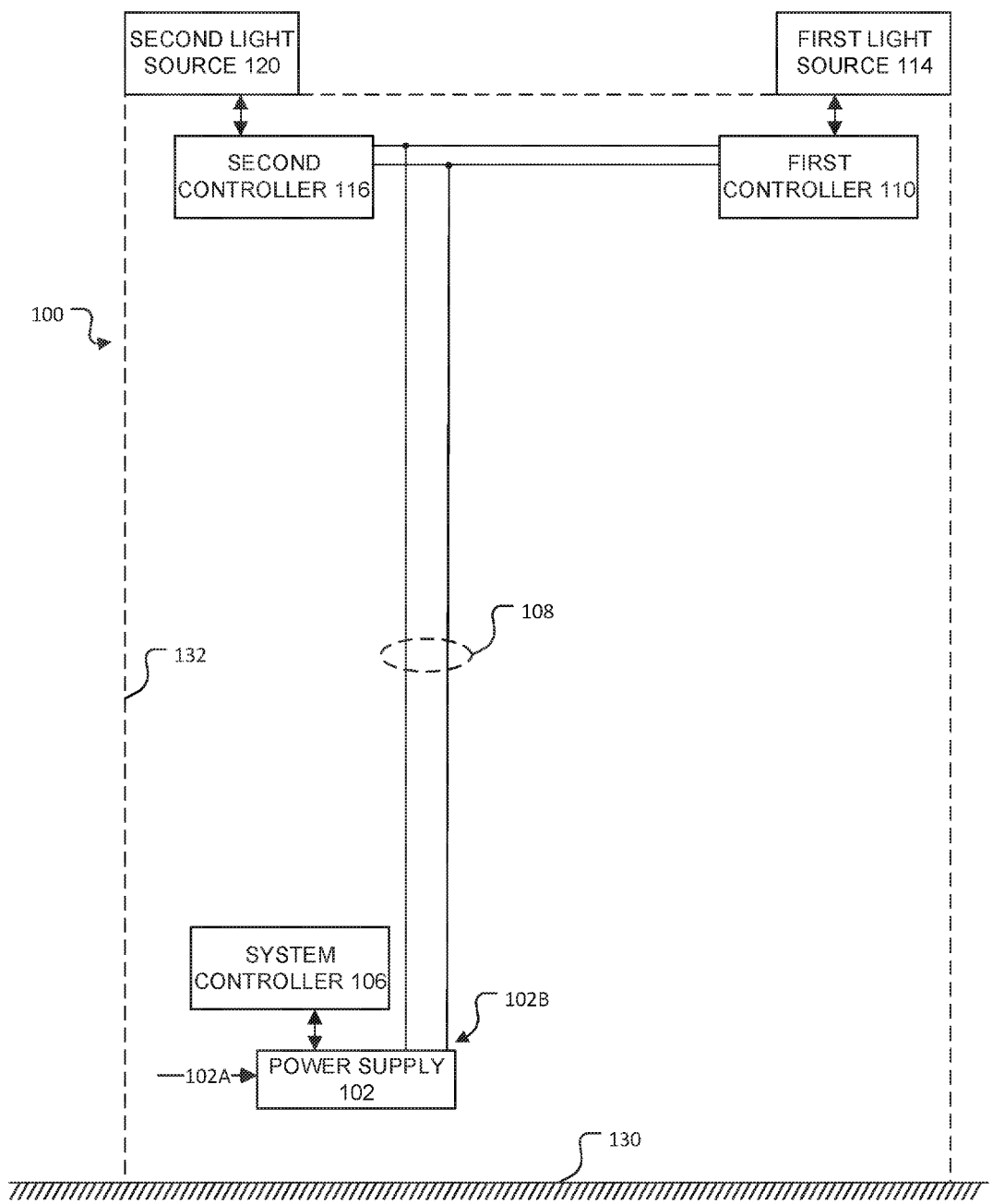
FIG. 1 illustrates an exemplary schematic of an obstruction lighting and power line control system, in accordance with an aspect of the disclosure.

The aspects of the disclosure and the various features and advantageous details thereof are explained more fully with reference to the non-limiting aspects and examples that are described and/or illustrated in the accompanying drawings and detailed in the following description. It should be noted that the features illustrated in the drawings are not necessarily drawn to scale, and features of one aspect may be employed with other aspects as the skilled artisan would recognize, even if not explicitly stated herein. Descriptions of well-known components and processing techniques may be omitted so as to not unnecessarily obscure the aspects of the disclosure. The examples used herein are intended merely to facilitate an understanding of ways in which the disclosure may be practiced and to further enable those of skill in the art to practice the aspects of the disclosure. Accordingly, the examples and aspects herein should not be construed as limiting the scope of the disclosure, which is defined solely by the appended claims and applicable law. Moreover, it is noted that like reference numerals represent similar parts throughout the several views of the drawings.

FIG. 1 illustrates an exemplary schematic of an obstruction lighting and power line control system, in accordance with an aspect of the disclosure. An obstruction lighting and power line control system 100 is illustrated in FIG. 1 and may include a power supply 102, a system controller 106, a power line cable 108, a first light source 114, and a first controller 110. In some aspects, the obstruction lighting and power line control system 100 of FIG. 1 may include a second controller 116 and a second light source 120.

In one aspect, the power line cable 108, the first light source 114, and the first controller 110 are supported by a structure 132. In another aspect, the power line cable 108, the first light source 114, the second light source 120, the first controller 110, and the second controller 116, are supported by the structure 132.

Although not explicitly shown in FIG. 1, the obstruction lighting and power line control system 100 may include additional components, such as, but not limited to, a photo-sensing or photodiode unit to determine ambient light of the obstruction lighting and power line control system 100, additional light sources with corresponding additional controllers therefor, antennas, grounding wires or cables, grounding circuitry, lightning rods, heat sinks, cooling fans, safety interlock switches, housings or enclosures for various components, switching regulators, power factor correctors, communication cables, mechanical platforms or bases for various components, modems, one or more wireless geo-positioning devices (e.g., global navigation satellite system (GNSS) devices such as GPS devices) with corresponding antennas, cellular communications antennas, reflectors and passive optical components for reflecting incident light, and the like.

In one aspect, the obstruction lighting and power line control system 100 may have only the first light source 114. Alternatively, the obstruction lighting and power line control system 100 may have light sources in addition to the first light source 114 and the second light source 120. Such additional light sources may be located at different positions or elevations relative to the first light source 114 and the second light source 120. For example, such additional light sources may be positioned at regular intervals between the second light source 120 and a base 130 of the structure 132 near ground level, but above the base 130 at a predetermined height from the base 130. Further by way of example only and not by way of limitation, the obstruction lighting and power line control system 100 may be a catenary lighting system having three levels (tiers) of lights. One tier may be installed at each of the following three locations: at a highest point or top of the structure 132, a lower point of the structure 132 (above the ground level or base 130), and half-way between the upper and lower levels of the structure 132. Each level may be lit to provide 360-degree coverage.

In one aspect, one or more components of the obstruction lighting and power line control system 100 may be combined into an integrated unit or a single box inside a protective housing. For example, the power supply 102 and the system controller 106 may be combined as a single unit, with the power supply 102 providing power to the system controller 106. Likewise, the first controller 110 and the first light source 114, and the second controller 116 and the second light source 120 may be combined into respective single units, as may be understood by one of ordinary skill in the art in view of this disclosure.

In one aspect, the power supply 102 is coupled to the power line cable 108. In one aspect, the power supply 102 and the system controller 106 are at a ground or terrestrial level, or are at a lowest height of the structure 132 with respect to the other components of the obstruction lighting and power line control system 100. This arrangement of the system controller 106 allows the technician to more easily access the system controller 106 of the obstruction lighting and power line control system 100 and modify parameters and/or modes of the obstruction lighting and power line control system 100. Moreover, a single setting of parameters and/or mode with the system controller 106 may be implemented in all light sources of the obstruction lighting and power line control system 100 reducing workload on the technician.

In one aspect, the first controller 110 is coupled to the power line cable 108. In one aspect, the first controller 110 is located substantially at a highest point of the structure 132, near or right below the first light source 114, which is at the highest point of the structure 132. In one aspect, the second controller 116 is coupled to the power line cable 108. In one aspect, the second controller 116 is located near the second light source 120. There may be additional light sources between the first light source 114 and the second light source 120.

Figure 2:
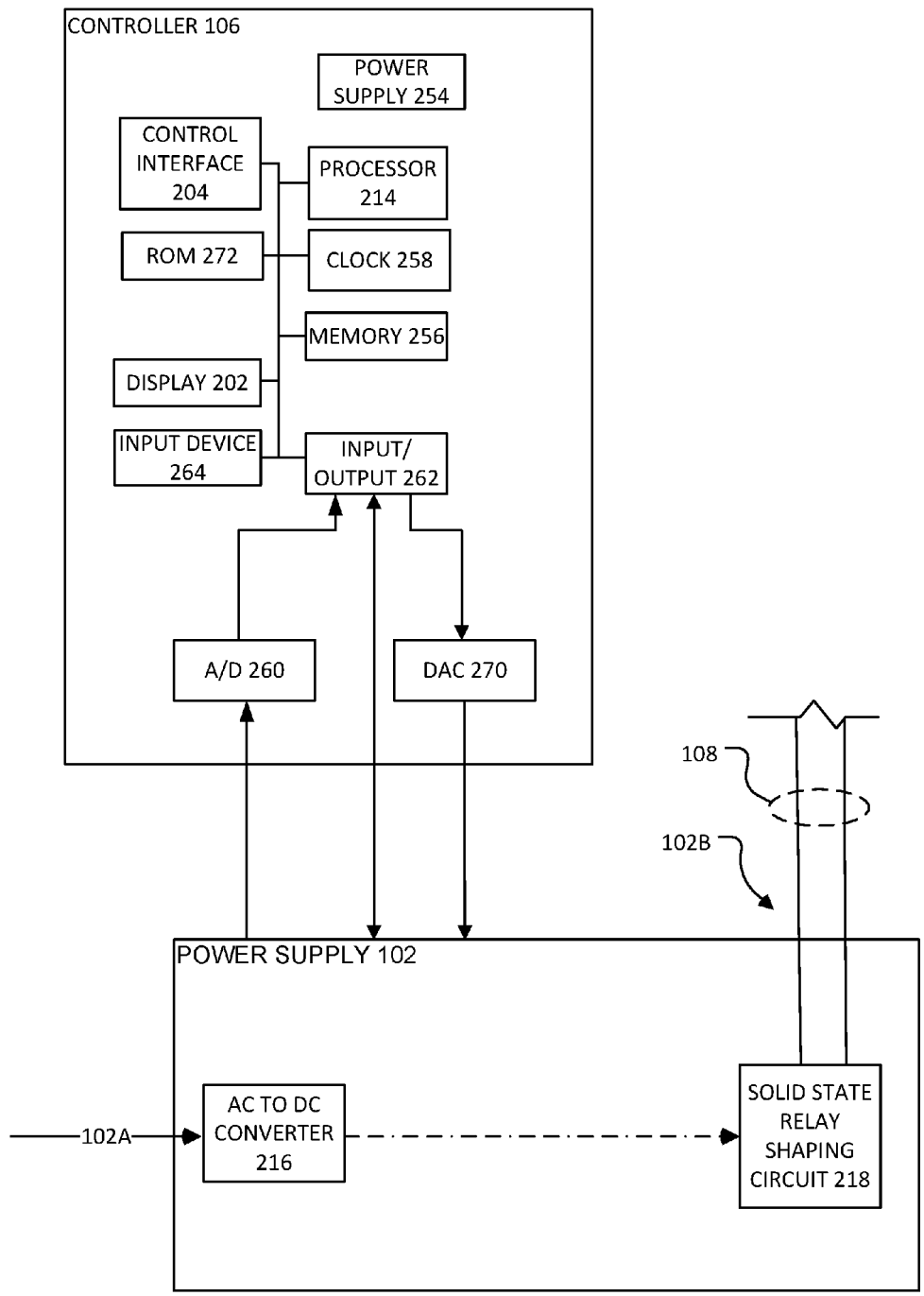
FIG. 2 illustrates a system controller and power supply of the obstruction lighting and power line control system of FIG. 1, in accordance with an aspect of the disclosure.

FIG. 2 illustrates a system controller and power supply of the obstruction lighting and power line control system of FIG. 1, in accordance with an aspect of the disclosure. In one aspect, the power supply 102 may include an input port 102A configured to receive input mains supply power. For example, the input port 102A may receive a 120V, a 240V, or other nominal voltage that may be an alternating current (AC) power from a mains power supply grid at 50 Hz or 60 Hz depending upon a geographical location, a distance from a power station, and/or the like to power the obstruction lighting and power line control system 100. The power supply 102 may include protection circuitry such as surge protectors (e.g., metal oxide varistors), fuses, ground fault interrupt devices, and the like to prevent damage to the obstruction lighting and power line control system 100 from various transients. In one aspect, to optimize design or control heating or cooling, the power supply 102 may include two or more separate power supplies.

In one aspect, the power supply 102 is configured to convert input AC power into direct current (DC) power with an AC to DC converter 216. Such DC power is output at a power output 102B. In one aspect, the converted DC power output at the power output 102B may be at 60V, although other values of DC power may be used as well, e.g., 24V, 48V, etc. The DC power is provided to the power line cable 108 and thus to various other components of the obstruction lighting and power line control system 100, e.g., the first light source 114, the second light source 120, the first controller 110, and/or the second controller 116. In one aspect, the power supply 102 may include full-wave and/or half-wave rectifiers configured to convert AC to DC, as known to one of ordinary skill in the art. In one aspect, the power supply 102 may include one or more step-down transformers to convert the input supply voltage of 120V, 240V or other nominal voltage amounts to a lower value of 60V, 24V, 48V, or other lower values, which are then output at the power output 102B. In one aspect, the power supply 102 may include DC-DC converter to modify the output DC voltage. In another aspect, the power supply 102 is configured to provide AC power to the power line cable 108 for operation based on alternating current.

The power supply 102 may further include a shaping circuit 218. The shaping circuit 218 may provide a power output 102B that is indicative of the parameters and/or mode to be implemented by the first light source 114 and/or second light source 120. The shaping circuit 218 may be implemented to provide the power output 102B with semiconductor switches in either on or off state. The semiconductor switches may include MOSFETs, insulated-gate bipolar transistors (IGBTs), solid-state relays, silicon controlled rectifiers (SCR), triodes for alternating current (TRIAC), or the like. Other approaches and devices for shaping the power output 102B of the power supply 102 are contemplated as well including mechanical relays. The shaping circuit 218 may shape power provided by the power output 102B to have pulses at a particular frequency, amplitude, and duration, as described in greater detail in FIG. 4, for controlling a parameter and/or mode of the light sources.

In one aspect, the system controller 106 is configured as a control unit for providing operating parameters and/or mode control for the obstruction lighting and power line control system 100. The system controller 106 may output control signals to the power supply 102 to control the power provided on the power line cable 108 to different components of the obstruction lighting and power line control system 100. By way of example only, such control signals may include parameter and/or mode control as detailed below. One benefit of the obstruction lighting and power line control system 100 controlling the light sources through the power supply 102 may include ease of installation, reduced costs, ease in retrofitting, and the like. It should be appreciated that controlling the light sources through the power supply 102 is distinguished from power line communication. Powerline line communication is a communication protocol that uses electrical wiring to simultaneously carry both data and electric power transmission or electric power distribution. In this regard, in one aspect the electric power provided by the power supply 102 provides the control signals that are indicative of the parameter and/or mode without any simultaneous data transmission.

In one aspect, the system controller 106 may include a printed circuit board (PCB). The system controller 106 may include a display 202, a control interface 204 to allow a technician or a user to interact with the display 202, a manual override switch, one or more alarm interface connections, a communications port, one or more status indicators, and a processor 214, in addition to other circuitry such as internal buses, filters, amplifiers, a GPS controller chip, heat sinks, ground circuitry, batteries, etc.

The processor 214 may be operably connected to a power supply 254, a memory 256, a clock 258, an analog to digital converter (A/D) 260, an input/output (I/O) port 262, and the like. The I/O port 262 may be configured to receive signals from any suitably attached electronic device and forward these signals from the A/D 260 and/or to processor 214. These signals may include signals from the power supply 102. If the signals are in analog format, the signals may proceed via the A/D 260. In this regard, the ND 260 may be configured to receive analog format signals and convert these signals into corresponding digital format signals. The I/O port 262 may also directly digitally communicate with the devices such as the power supply 102 directly.

The system controller 106 may include a digital to analog converter (DAC) 270 that may be configured to receive digital format signals from the processor 252, convert these signals to analog format, and forward the analog signals from the I/O port 262. In this manner, electronic devices including the power supply 102 that are configured to utilize analog signals may receive communications or be driven by the processor 214. The processor 214 may be configured to receive and transmit signals to and from the DAC 270, ND 260 and/or the I/O port 262. The processor 214 may be further configured to receive time signals from the clock 258. In addition, the processor 214 may be configured to store and retrieve electronic data to and from the memory 256. The system controller 106 may further include a display 268, an input device 264, and a read-only memory (ROM) 274. Finally, the processor 214 may include a program stored in the memory 256 executed by the processor 214 to execute the process 500 described herein.

In one aspect, the display 202 may be a multi-line organic LED (OLED) display, although other types of displays such as liquid crystal displays (LCDs) could be used. The display 202 provides system status, alarm and programming information, and the like to a user of the system controller 106. In one aspect, a control interface 204 may be coupled to the display 202 for a user to interact with the display 202. The control interface 204 may include pushbuttons, switches, dials, and the like to provide the user interface for the system controller 106, although other types of interactive devices may be used.

Figure 3:
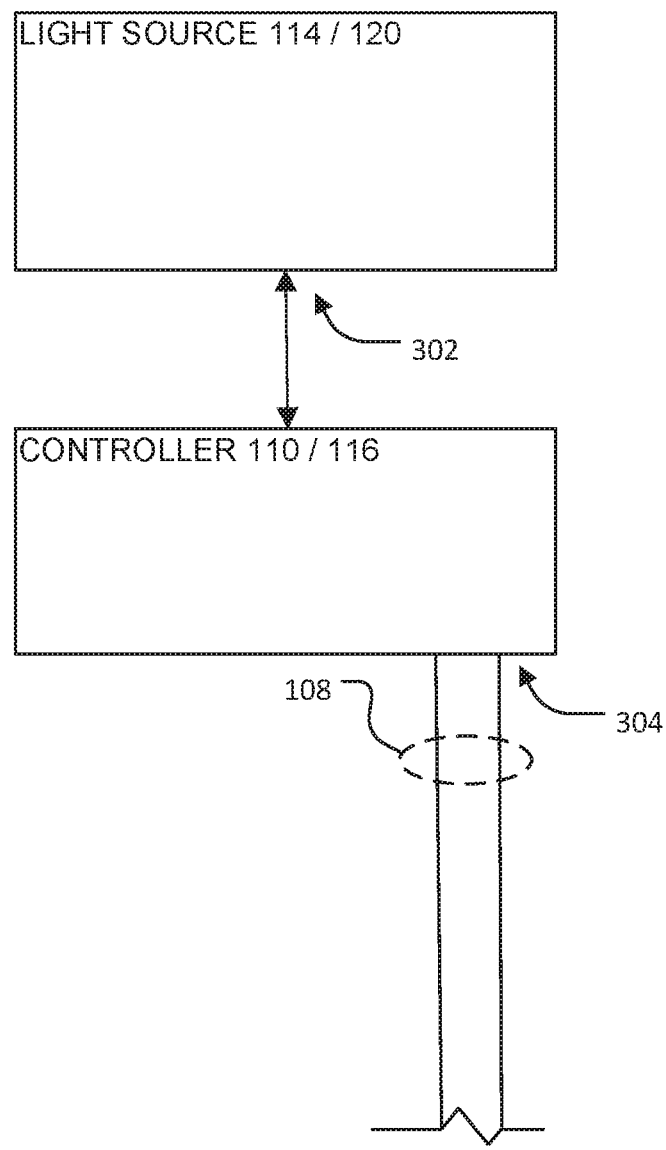
FIG. 3 illustrates a light source and controller of the obstruction lighting and power line control system of FIG. 1, in accordance with an aspect of the disclosure.

FIG. 3 illustrates a light source and controller of the obstruction lighting and power line control system of FIG. 1, in accordance with an aspect of the disclosure. In one aspect, the first controller 110 and the second controller 116 are configured to control the first light source 114 and the second light source 120. The first controller 110 and the second controller 116 may be physically attached directly to an input power port 302 of the first light source 114 and the second light source 120, respectively. In one aspect, the first controller 110 and the second controller 116 may each include an input power port 304, a voltage status indicator, an alarm, and an output port, in addition to other electronic circuitry similar to the system controller 106. The input power port 304 may input DC power from the power line cable 108, and may feed it to a DC-DC converter (not shown) to bring the voltage to an appropriate level (e.g., 3.3V, 5V, etc.). The voltage status indicator may provide voltage level information during setup or maintenance of the first light source 114 and the second light source 120. The alarm may be an LED configured to provide an indication of proper functioning of the first light source 114 and/or the second light source 120.

The first light source 114 and the second light source 120 may each include one or more light emitting diodes (LEDs) or arrays of LEDs. Alternatively or additionally, the first light source 114 and the second light source 120 may be an inert gas light source such as a Xenon based light source, an incandescent light source, and the like. By way of example only, the first light source 114 and the second light source 120 may be a beacon light having a lens described in U.S. Pat. No. 8,926,148 issued Jan. 6, 2015 incorporated by reference in its entirety and implemented as the VAN-GUARD™ LED series light source provided by Flash Technology of Franklin, Tenn. As such, the first light source 114 and the second light source 120 may be designed to have performance specifications in compliance with aviation authorities such as the Federal Aviation Authority (FAA), International Civil Aviation Organization (ICAO), country specific lighting requirements, and the like. Various operational parameters for such FAA and ICAO compliant lighting systems are known to one of ordinary skill in the art and will not be described herein. Additionally, numerous countries have specific lighting requirements including Sweden, Germany, and the like that are known to one of ordinary skill in the art and will not be described herein.

For example, such parameters and/or mode may be flash intensity, day mode, night mode, flash rate (day/night), flash duration, flash color, no flash (steady on), duty cycle, and the like of the first light source 114, the second light source 120, and/or other light sources. For example, a first mode may be flash intensity, day mode, night mode, flash rate (day/night), flash duration, flash color, no flash (steady on), duty cycle, and the like for the first light source 114, the second light source 120 and/or other light sources consistent with FAA requirements; a second mode may be flash intensity, day mode, night mode, flash rate (day/night), flash duration, flash color, no flash (steady on), duty cycle and the like for the first light source 114, the second light source 120, and/or other light sources consistent with ICAO requirements; a third mode may be flash intensity, day mode, night mode, flash rate (day/night), flash duration, flash color, no flash (steady on), duty cycle and the like for the first light source 114, the second light source 120, and/or into the light sources consistent with increased efficiency such as higher intensity and a shorter duration; and a fourth mode may be flash intensity, day mode, night mode, flash rate (day/night), flash duration, flash color, no flash (steady on), duty cycle and the like for the first light source 114, the second light source 120, and/or other light sources consistent with certain legacy implementations such as lower intensity and longer duration. Other modes are contemplated as well.

Other parameters and/or modes include power consumption, power output, luminosity, temperature, voltage, current, run time, etc. of the first light source 114, the second light source 120, and/or other light sources. The parameters and/or mode may be determined by the controllers 110, 116 utilizing various sensor types including voltage sensors, current sensors, and the like to detect physical characteristics of the power including amplitude, duration, and frequency from the power provided by the power supply 102. Each of the sensor types may include power sources, analog to digital converters, conversion circuits, registers to store the sensed values, and the like. The controllers 110, 116 utilizing the sensor(s) to detect the physical characteristics of the power provided by the power supply 102 to ascertain a desired operating parameter and/or mode. In one aspect, the controllers 110, 116 thereafter may store the desired operating parameter and/or mode and drive the first light source 114, the second light source 120, and/or other light sources in accordance with the desired operating parameter and/or mode. In another aspect, the controllers 110, 116 may drive the first light source 114, the second light source 120, and/or other light sources in accordance with the desired operating parameter and/or mode without storage.

In one aspect, the controllers 110, 116 include a processor that receives a power pulse frequency and duration provided in the power provided by the power supply 102 that indicates the intended operation. After determining a mode, the controllers 110, 116 will power the light source 114, 120 for the appropriate time, at a specific intensity, and the like via a digital to analog converter (DAC) to the LED driver circuitry.

In one aspect, the first light source 114 is a beacon light source and the second light source 120 is a marker light source located below the first light source 114 or the beacon light source. As discussed, additional marker light sources may be present in the obstruction lighting and power line control system 100 along with, above, and/or below the second light source 120. In one aspect, the first light source 114 and/or the second light source 120 may output white light. Alternatively, in one aspect the first light source 114 and/or the second light source 120 may output red light. Further, in one aspect, the first light source 114 and/or the second light source 120 may selectively output white light and red light, although other wavelengths of light (e.g., blue) may be output including infrared for pilots utilizing night vision devices. In one aspect, the first light source 114 and/or the second light source 120 are configured to receive DC power from the power line cable 108 via the first controller 110 and the second controller 116, respectively, coupled thereto. In one aspect, the first light source 114 and/or the second light source 120 are arranged to generate a 360° horizontal beam pattern and a predetermined vertical beam pattern.

Figure 4:
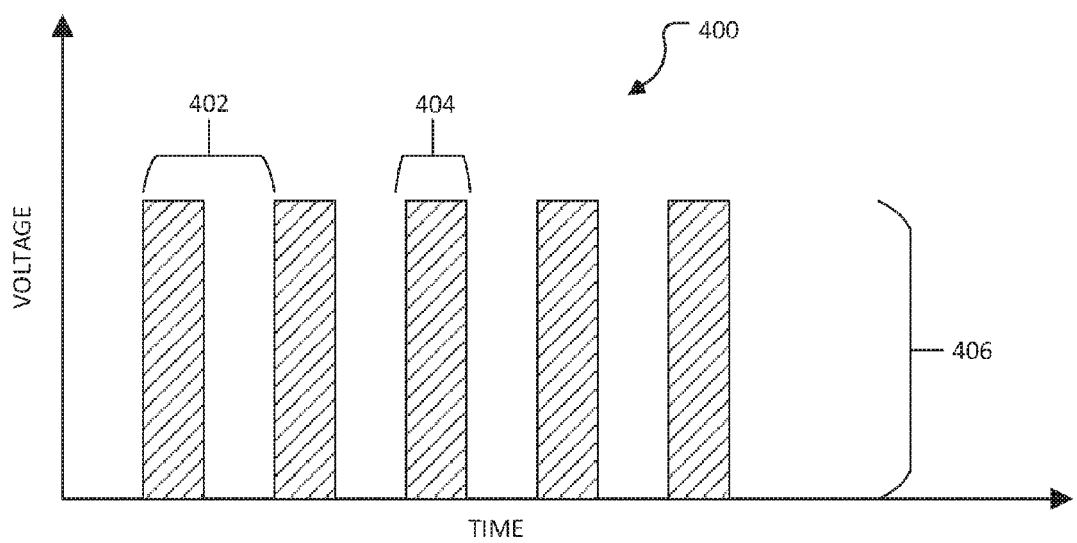
FIG. 4 illustrates an exemplary plot of power signals carried by a power line cable of the obstruction lighting and power line control system of FIG. 1, in accordance with an aspect of the disclosure.

The power line cable 108 runs from the power supply 102 all the way up to the first light source 114 along the structure 132. The power line cable 108 is designed to carry DC power (e.g., 60V DC). Alternatively, AC power may be provided. In one aspect, the power line cable 108 may be able to transmit the power signals at a predetermined amplitude, frequency, and duration. Such signals on the power line cable 108 are part of the DC power signals from the power supply 102. In one aspect, the modulated signals may be output by the DC power signal from the power supply 102, as illustrated in FIG. 4 by way of example only. For example, the power signal may include parameters and/or mode signals for the first light source 114, the second light source 120, and/or other light sources. The power line cable 108 may include an outer insulation covering and an inner conductor of suitable gauge and material. The power line cable 108 may be secured at regular or random intervals along a length thereof to the structure 132. Such securing may utilize strong tape material (e.g., insulating duct tape), clamps, screws, bolts, etc., as known to one of ordinary skill in the art.

The structure 132 may be a tower (e.g., a communications tower), a wind-turbine, a factory chimney, a cooling tower, a tall or high-rise building, a tower atop a building, or other elevated structures known to one of ordinary skill in the art. For example, the structure 132 may be part of a repeater station for a cellular network or other type of communication network. Further by way of example only, the structure 132 may be made of metal, composite material, concrete or other rigid material capable of supporting various components of the obstruction lighting and power line control system 100. Generally, the obstruction lighting and power line control system 100 may be installed at any structure that needs to be visible to flying fixed wing aircraft or rotary wing aircraft (helicopters) for warning or alerting the pilot of such flying aircraft about a presence of the structure 132. Further, the structure 132 is arranged to physically support the power line cable 108, along with the first light source 114, the first controller 110, and the like. As may be understood by one of ordinary skill in the art in view of this disclosure, although not explicitly shown, the structure 132 may support additional hardware including but not limited to antennas, housings, other cables (e.g., grounding cables), lightning rods, etc.

FIG. 4 illustrates an exemplary plot of power signals carried by a power line cable of the obstruction lighting and power line control system of FIG. 1, in accordance with an aspect of the disclosure. Referring to FIG. 4, an example plot illustrating a DC power signal implementing a power signal 400 on the power line cable 108 is shown. In one aspect, the power signal 400 is provided on the power line cable 108. In this scenario, the power supply 102 may be configured to provide the power signal 400. The power signal 400 may include a particular frequency 402, a particular duration 404, a particular amplitude 406, and other physical characteristics. In one aspect, the particular frequency 402, the particular duration 404, the particular amplitude 406, and other physical characteristics of the power signal 400 generated by the power supply 102 communicates the operating parameters and/or modes to the first controller 110 for operating the first light source 114. In another aspect, the particular frequency 402, the particular duration 404, the particular amplitude 406, and other physical characteristics of the power signal 400 generated by the power supply 102 communicates the operating parameters and/or modes to the first controller 110 for operating the first light source 114 and the second controller 116 for operating the second light source 120. In another aspect, the particular frequency 402, the particular duration 404, the particular amplitude 406, and other physical characteristics of the power signal 400 generated by the power supply 102 communicates the operating parameters and/or modes to the first controller 110 for operating the first light source 114, the second controller 116 for operating the second light source 120, and other controllers for operating other light sources. The operating modes may include one or more number of modes as described herein for the first light source 114, the second light source 120, and/or other light sources. The operating parameters may include one or more of flash intensity, day mode, night mode, flash rate (day/night), flash duration, flash color, no flash (steady on), duty cycle, and the like for the first light source 114, the second light source 120, and/or other light sources.

In one aspect, the particular frequency 402 of the power signal 400 generated by the power supply 102 communicates the flash rate for the first light source 114, the second light source 120, and/or the other light sources. In one aspect, the particular duration 404 of the power signal 400 generated by the power supply 102 communicates the brightness for the first light source 114, the second light source 120, and/or the other light sources. In one aspect, the particular duration 404 of the power signal 400 generated by the power supply 102 communicates the intensity for the first light source 114, the second light source 120, and/or the other light sources. In one aspect, the particular duration 404 of the power signal 400 generated by the power supply 102 communicates the duration for the first light source 114, the second light source 120, and/or the other light sources.

Figure 5:
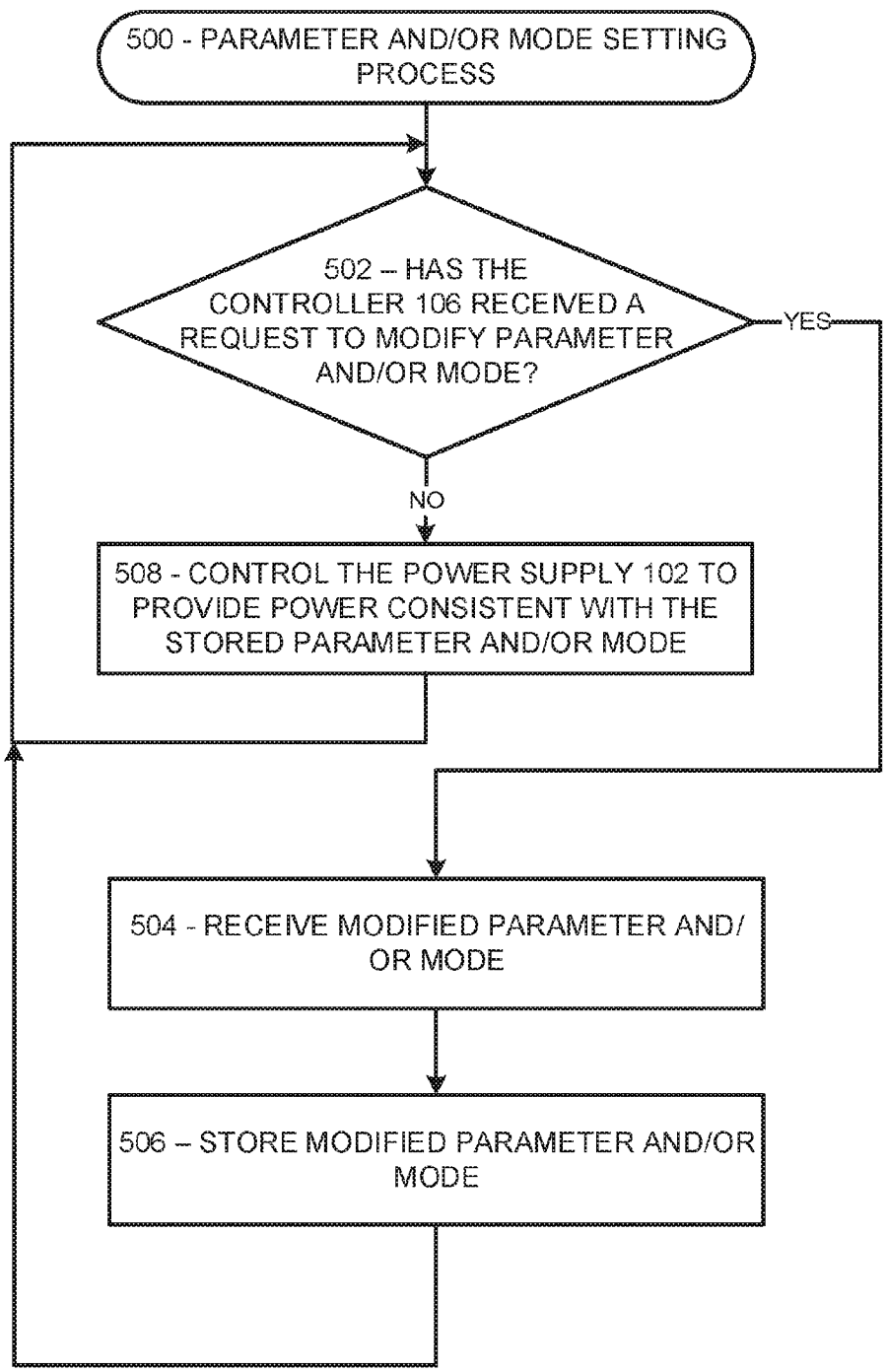
FIG. 5 illustrates a process of controlling the obstruction lighting and power line control system of FIG. 1, in accordance with an aspect of the disclosure.

FIG. 5 illustrates a process of controlling the obstruction lighting and power line control system of FIG. 1, in accordance with an aspect of the disclosure. In particular, FIG. 5 illustrates a parameter and/or mode signals process 500 that may be implemented by the system controller 106 for controlling at least one of the first light source 114, the second light source 120, and/or other light sources. In one aspect, the process 500 may be implemented by the processor 214 of the system controller 106. The process 500 may be implemented by other components as well. However, for brevity the process 500 will be described with respect to the system controller 106.

In box 502, the process 500 implemented by the system controller 106 may determine whether there has been received a request to modify parameter and/or mode. The request may be received by the control interface 204, the display 202, the input device 264, a device connected to the system controller 106, and/or the like. If there has been a request to modify parameter and/or mode (YES), then the process 600 advances to box 504. If there was no request to modify parameter and/or mode (NO), then the process 600 advances to box 508.

In box 504 the process 500 implemented by the system controller 106 may receive a modified parameter and/or mode. The modified parameter and/or mode may be input by the control interface 204, the display 202, the input device 264, a device connected to the system controller 106, and/or the like. The modified parameter and/or mode may be an input selection of the first mode, second mode, third mode, fourth mode, or the like described above. Alternatively, the modified parameter and/or mode may be an input of one or more of the flash intensity, day mode, night mode, flash rate (day/night), flash duration, flash color, no flash (steady on), duty cycle, and the like for the first light source 114 and/or the second light source 120.

Once the modified parameter and/or mode has been input, the modified parameter and/or mode 506 may be stored in memory 256 of the system controller 106, a memory of the power supply 102, or the like. Alternatively, the parameter and/or mood may be stored as a switch position, dial position, button position, or similar device positioning.

In box 508, the power supply 102 may provide power consistent with the stored parameter and/or mode. In this regard, the power supply 102 may operate together with the shaping circuit 218 to provide a power supply indicative of the parameter and/or mode the user has designated for the first light source 114, the second light source 120, and/or the other light sources. In one aspect, the power supply 102 may operate together with the shaping circuit 218 may continuously provide a power supply indicative of the parameter and/or mode the user has designated for the first light source 114, the second light source 120, and/or the other light sources. In another aspect, the power supply 102 may operate together with the shaping circuit 218 to provide a power supply indicative of the parameter and/or mode the user has designated for the first light source 114, the second light source 120, and/or the other light sources during initialization. In another aspect, the power supply 102 may operate together with the shaping circuit 218 to provide a power supply indicative of the parameter and/or mode the user has designated for the first light source 114, the second light source 120, and/or the other light sources during startup. In another aspect, the power supply 102 may operate together with the shaping circuit 218 to provide a power supply indicative of the parameter and/or mode the user has designated for the first light source 114, the second light source 120, and/or the other light sources at selective times.

Accordingly, the characteristics of the power supplied by the power supply 102, as controlled by the system controller 106, control a parameter and/or mode of the first light source 114, the second light source 120, and/or the other light sources. The control of a parameter and/or mode of the first light source 114, the second light source 120, and/or the other light sources is through operation of the system controller 106. As a result, the obstruction lighting and power line control system 100 is safer than conventional systems, utilizes less hardware than conventional systems, and allows maintenance personnel to control and modify the system in an efficient manner. Accordingly, installation, operational and maintenance costs for the obstruction lighting and power line control system 100 are lower than conventional systems, although other advantages exist for the obstruction lighting and power line control system 100 over the conventional systems, as may be understood by one of ordinary skill in the art in view of the present disclosure. Additionally, the disclosed obstruction lighting and power line control system controlling the light sources through the power supply may include ease installation, reduce costs, ease in retrofit installation, and the like.

The invention may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

Further in accordance with various embodiments of the invention, the processor 214 and the methods described herein are intended for operation with dedicated hardware implementations including, but not limited to, programmable logic controller (PLC), microprocessor, PCs, PDAs, semiconductors, application specific integrated circuits (ASIC), programmable logic arrays, cloud computing devices, and other hardware devices constructed to implement the methods described herein.

It should also be noted that the software implementations of the invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

While the disclosure has been described in terms of exemplary aspects, those skilled in the art will recognize that the disclosure can be practiced with modifications in the spirit and scope of the appended claims. The examples given above are merely illustrative and are not meant to be an exhaustive list of all possible designs, aspects, applications or modifications of the disclosure.

What is claimed is:

1. An obstruction lighting and power line control system, comprising:
   at least one light source;
   at least one controller coupled to and configured to control the at least one light source;
   a power line cable providing power to the at least one light source;
   a power supply coupled to the power line cable and configured to provide power to the at least one light source over the power line cable, wherein the power supply further comprises a shaping circuit and the shaping circuit comprises a solid-state relay; and
   a system controller configured to control the power supply to provide power over the power line cable to the at least one light source and the at least one controller that indicates at least one of the following: operating parameters and operating modes.

2. The obstruction lighting and power line control system of claim 1, wherein the at least one light source is a beacon light source.

3. The obstruction lighting and power line control system of claim 1 wherein the system controller is configured to control the power supply to provide the power over the power line cable to the at least one light source that indicates the operating parameters that include at least one of the following: flash intensity, day mode, night mode, flash rate (day/night), flash duration, flash color, no flash (steady on), and duty cycle.

4. The obstruction lighting and power line control system of claim 1 wherein the system controller is configured to control the power supply to provide the power over the power line cable to the at least one light source that indicates an operating mode that includes FAA mode and ICAO mode.

5. The obstruction lighting and power line control system of claim 1 wherein the system controller is configured to control the power supply to provide the power over the power line cable to the at least one light source that indicates an operating mode that includes FAA mode, ICAO mode, and a country specific mode.

6. The obstruction lighting and power line control system of claim 1, wherein the at least one light source comprises a plurality of light sources; and the plurality of light sources comprise a plurality beacon light sources.

7. The obstruction lighting and power line control system of claim 1, wherein the power supply coupled to the power line cable provides DC power.

8. The obstruction lighting and power line control system of claim 1, wherein the power supply coupled to the power line cable provides AC power.

9. An obstruction lighting and power line control process, comprising:
   providing at least one light source;
   controlling the at least one light source with at least one controller;
   providing a power line cable to provide power to the at least one light source;
   providing power to the at least one light source over the power line cable with a power supply coupled to the power line cable, wherein the power supply further comprises a shaping circuit and the shaping circuit comprises a solid-state relay; and
   controlling with a system controller the power supply to provide power over the power line cable to the at least one light source and the at least one controller that indicates at least one of the following: operating parameters and operating modes.

10. The obstruction lighting and power line control process of claim 9, wherein the at least light source is a beacon light source.

11. The obstruction lighting and power line control process of claim 9 wherein the system controller is configured to control the power supply to provide the power over the power line cable to the at least one light source that indicates the operating parameters that include at least one of the following: flash intensity, day mode, night mode, flash rate (day/night), flash duration, flash color, no flash (steady on), and duty cycle.

12. The obstruction lighting and power line control process of claim 9 wherein the system controller is configured to control the power supply to provide the power over the power line cable to the at least one light source that indicates an operating mode that include FAA and ICAO.

13. The obstruction lighting and power line control process of claim 9 wherein the system controller is configured to control the power supply to provide the power over the power line cable to the at least one light source that indicates an operating mode that include FAA, ICAO, and a country specific mode.

14. The obstruction lighting and power line control process of claim 9, wherein the at least one light source comprises a plurality of light sources; and the plurality of light sources comprise a plurality beacon light sources.

15. The obstruction lighting and power line control process of claim 9, wherein the power supply coupled to the power line cable provides DC power.

16. The obstruction lighting and power line control process of claim 9, wherein the power supply coupled to the power line cable provides AC power.

* * * * *